(12) United States Patent
Tsai

(10) Patent No.: US 8,406,315 B2
(45) Date of Patent: Mar. 26, 2013

(54) SIGNAL TRANSMISSION APPARATUS, TRANSMISSION METHOD AND COMPUTER STORAGE MEDIUM THEREOF

(75) Inventor: Tsung-Yu Tsai, Shanhua Town (TW)

(73) Assignee: Institute for Information Industry, Taipei (TW)

( * ) Notice: Subject to any disclaimer, the term of this patent is extended or adjusted under 35 U.S.C. 154(b) by 457 days.

(21) Appl. No.: 12/711,134

(22) Filed: Feb. 23, 2010

(65) Prior Publication Data

US 2010/0215087 A1    Aug. 26, 2010

Related U.S. Application Data

(60) Provisional application No. 61/154,441, filed on Feb. 23, 2009.

(51) Int. Cl.
*H04L 27/00* (2006.01)

(52) U.S. Cl. ........................................................ 375/259

(58) Field of Classification Search .................. 375/259, 375/295, 316, 340, 341, 324, 325, 326; 370/302, 370/308
See application file for complete search history.

(56) References Cited

U.S. PATENT DOCUMENTS

| | | | |
|---|---|---|---|
| 2004/0114506 A1* | 6/2004 | Chang et al. | 370/208 |
| 2007/0097897 A1* | 5/2007 | Teague et al. | 370/312 |
| 2007/0195906 A1* | 8/2007 | Kim et al. | 375/267 |

* cited by examiner

*Primary Examiner* — David C. Payne
*Assistant Examiner* — Vineeta Panwalkar
(74) *Attorney, Agent, or Firm* — Skaar Ulbrich Macari, P.A.

(57) ABSTRACT

A signal transmission apparatus, a transmission method and a computer storage medium thereof are provided. The signal transmission apparatus may generate reference signals which are antipodal to each other and transmit the reference signals by subcarriers which are adjacent to each other. Thereby, the communication channel of the wireless network may be estimated accurately to improve the reliability of the following signal transmission.

3 Claims, 8 Drawing Sheets

| A9 | D1 | D1 | D1 | A11 |
|----|----|----|----|-----|
| A9 | D1 | D1 | D1 | A11 |
| D1 | D1 | A10 | D1 | D1 |
| D1 | D1 | A10 | D1 | D1 |

+

| A5 | D2 | D2 | D2 | A7 |
|----|----|----|----|----|
| -A5 | D2 | D2 | D2 | -A7 |
| D2 | D2 | A6 | D2 | D2 |
| D2 | D2 | -A6 | D2 | D2 |

FIG. 5

SIGNAL TRANSMISSION APPARATUS, TRANSMISSION METHOD AND COMPUTER STORAGE MEDIUM THEREOF

PRIORITY

This application claims priority to U.S. Patent Provisional Application No. 61/154,441 filed on Feb. 23, 2009, the disclosure of which is incorporated by reference herein in its entirety.

FIELD

The present invention relates to a signal transmission apparatus, a transmission method and a computer storage medium thereof. More particularly, the present invention relates to a signal transmission apparatus, a transmission method and a computer storage medium thereof that can generate reference signals antipodal to each other.

BACKGROUND

Owing to advancement in wireless communication technologies, a wide variety of wireless signal transmission apparatuses, such as cell phones, personal digital assistants (PDAs), notebook computers and the like, have found wide application in people's daily life. For users of the wireless signal transmission apparatuses, one of the concerns is the communication quality of wireless networks.

As a measure to provide better communication quality of the wireless networks, the multiple carrier transmission technology has been developed. In particular, the multiple carrier transmission technology utilizes multiple orthogonal subcarriers to transmit signals, so it has such advantages as a high spectrum efficiency and multi-path. Accordingly, the multiple carrier transmission technology (e.g., OFDM, SC-FDMA, MC-CDMA) has become one of the most important transmission technologies for the next generation of wireless communication.

Albeit of the aforesaid advantages, multiple carrier transmission often suffers from inter-carrier interference (ICI) caused by the carrier frequency offset, the Doppler effect and the like factors, leading to degraded transmission quality of transmission channels. Furthermore, generally, in order to prevent or mitigate degradation in transmission quality of the transmission channels caused by the interference, a technical means conventionally adopted is to make channel estimation on the transmission channels; however, it fails to take the inter-carrier interference into account, which dramatically decreases accuracy of the channel estimation and, consequently, affects the transmission quality of the multiple carrier transmission.

Accordingly, efforts still have to be made in the art to provide a solution that can effectively make channel estimation on the multiple carrier transmission and mitigate the inter-carrier interference.

SUMMARY

An objective of certain embodiments of the present invention is to provide a signal transmission apparatus for use in a wireless network. The wireless network comprises a host apparatus. The signal transmission apparatus comprises a storage, a microprocessor and a transceiving interface. The microprocessor is electrically connected to the storage and the transceiving interface respectively.

The storage is configured to store wireless network frame information that records an arrangement of a plurality of subcarriers included in a wireless network frame. The plurality of subcarriers includes a first subcarrier and a second subcarrier adjacent to the first subcarrier. The microprocessor is configured to generate a first reference signal, and arrange the first reference signal into the first subcarrier according to the wireless network frame information, and is further configured to generate a second reference signal that is antipodal to the first reference signal and arrange the second reference signal into the second subcarrier according to the wireless network frame information. The transceiving interface is configured to transmit the first reference signal and the second reference signal via the first subcarrier and the second subcarrier respectively so that the host apparatus can estimate conditions of a first communication channel between the host apparatus and the signal transmission apparatus according to the first reference signal and the second reference signal.

An objective of certain embodiments of the present invention is to provide a transmission method for the signal transmission apparatus described above. The transmission method comprises the steps of: (a) enabling the microprocessor to generate a first reference signal; (b) enabling the microprocessor to arrange the first reference signal into the first subcarrier according to the wireless network frame information; (c) enabling the microprocessor to generate a second reference signal antipodal to the first reference signal; (d) enabling the microprocessor to arrange the second reference signal into the second subcarrier according to the wireless network frame information; and (e) enabling the transceiving interface to transmit the first reference signal and the second reference signal via the first subcarrier and the second subcarrier respectively so that the host apparatus can estimate conditions of a first communication channel between the host apparatus and the signal transmission apparatus according to the first reference signal and the second reference signal.

Use of reference signals that are in an antipodal relationship or in a cyclic sequence relationship mitigates the inter-carrier interference so that the communication channel of the wireless network can be estimated accurately to improve reliability of subsequent signal transmissions. Thereby, shortcomings of the prior art are addressed.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 5 is a schematic view illustrating arrangement of resources of the wireless network frame according to the first example embodiment;

Figure 1:
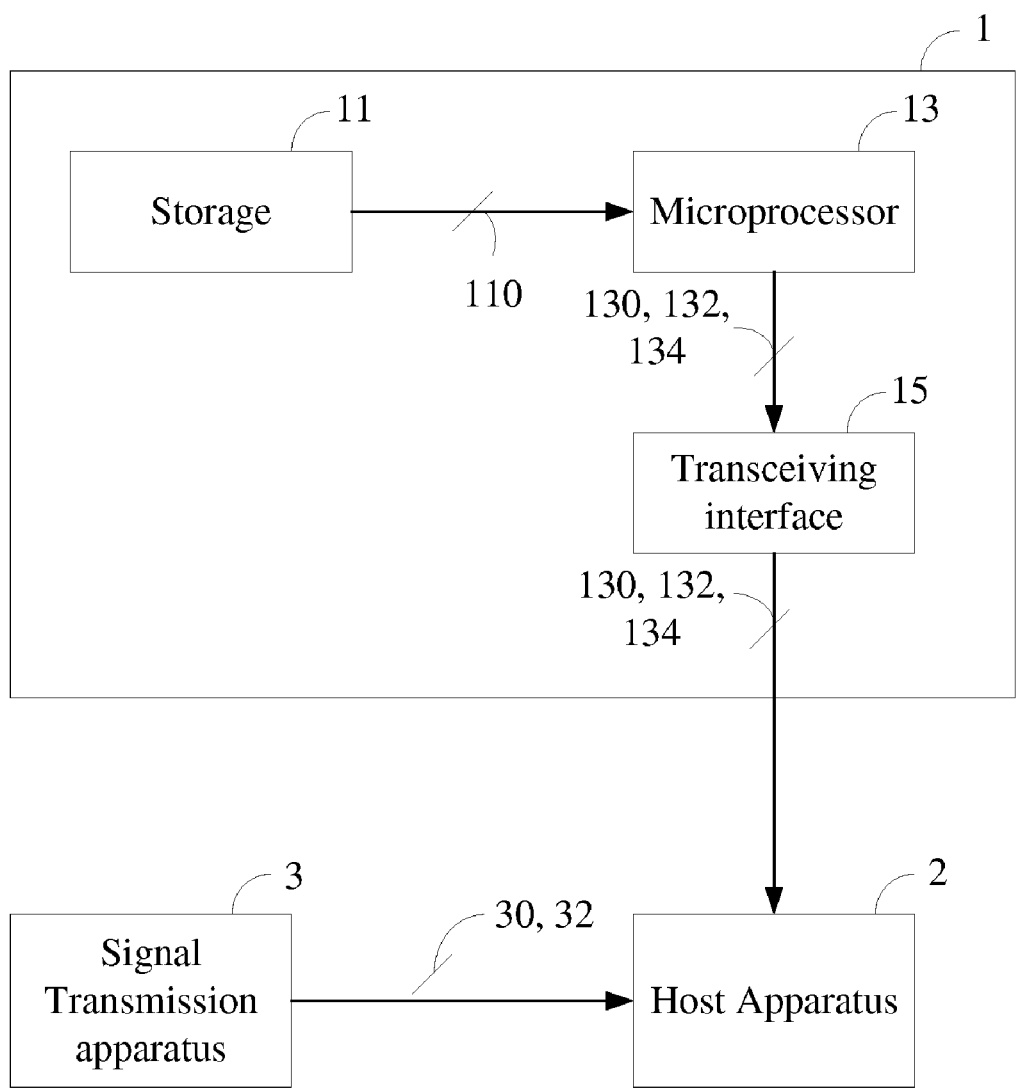
FIG. 1 is a schematic view of a first example embodiment of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, the present invention will be explained with reference to example embodiments thereof. However, these example embodiments are not intended to limit the present invention to any specific environment, applications or particular implementations described in these example embodiments. Therefore, description of these example embodiments is only for purpose of illustration rather than to limit the present invention. It should be appreciated that, in the following example embodiments and the attached drawings, elements unrelated to the present invention are omitted from depiction; and dimensional relationships among individual elements in the attached drawings are illustrated only for ease of understanding, but not to limit the actual scale.

A first example embodiment of the present invention is shown in FIG. 1, which is a schematic view of a wireless network. The wireless network, which may be an orthogonal frequency-division multiplexing (OFDM) wireless network, comprises a signal transmission apparatus 1, a host apparatus 2 and a signal transmission apparatus 3. It shall be noted that, the signal transmission apparatus 1 and the signal transmission apparatus 3 may be respectively a network apparatus for use in an OFDM wireless network such as a mobile station and a relay station, and the host apparatus 2 may be a base station for use in the OFDM wireless network.

Hereinbelow, interactions between the signal transmission apparatus 1, the host apparatus 2 and the signal transmission apparatus 3 will be described. The signal transmission apparatus 1 comprises a storage 11, a microprocessor 13 and a transceiving interface 15. The microprocessor 13 is electrically connected to the storage 11 and the transceiving interface 15 respectively. The storage 11 is configured to store wireless network frame information 110 that records arrangement of a plurality of subcarriers contained in a wireless network frame. The plurality of subcarriers includes a first subcarrier and a second subcarrier adjacent to the first subcarrier.

Figure 2:
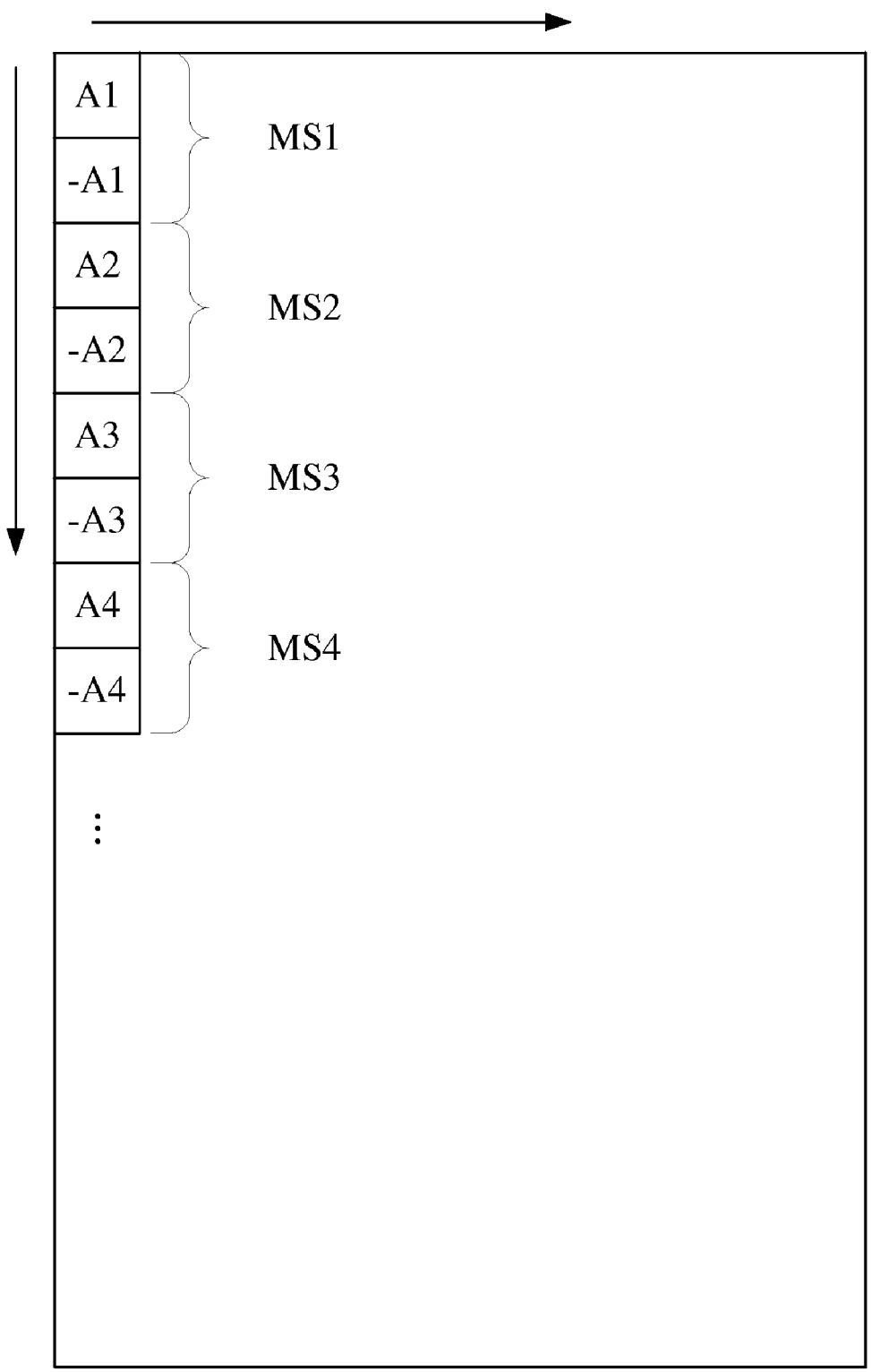
FIG. 2 is a schematic view illustrating arrangement of resources of a wireless network frame according to the first example embodiment.

Specifically, referring to FIG. 2, a schematic view illustrating arrangement of resources of a wireless network frame is shown therein. In FIG. 2, the horizontal axis represents the time, and the vertical axis represents the frequency. Through division of the time and the frequency, each small check in the wireless network frame represents a subcarrier. In this way, arrangement of the resources of the wireless network frame can be clearly demonstrated. Additionally, MS1 to MS4 in FIG. 2 represent single signal transmission apparatuses respectively, so resource arrangement for four signal transmission apparatuses is shown in FIG. 2. For convenience of the following description, it is assumed that MS1 shown in FIG. 2 is just the signal transmission apparatus 1, and the two subcarriers occupied by MS1 are a first subcarrier and a second subcarrier adjacent to the first subcarrier.

In order to measure conditions of a first communication channel between the signal transmission apparatus 1 and the host apparatus 2, the microprocessor 13 of the signal transmission apparatus 1 generates a first reference signal 130 (i.e., A1 in FIG. 2) and a second reference signal 132 (i.e., −A1 in FIG. 2) that is antipodal to the first reference signal 130. And in order to mitigate the inter-carrier interference (ICI), the microprocessor 13 arranges the first reference signal 130 and the second reference signal 132 into the first subcarrier and the second subcarrier according to the wireless network frame information 110.

After completion of arranging the first reference signal 130 and the second reference signal 132, the transceiving interface 15 of the signal transmission apparatus 1 transmits the first reference signal 130 and the second reference signal 132 via the first subcarrier and the second subcarrier respectively so that conditions of a first communication channel between the host apparatus 2 and the signal transmission apparatus 1 can be estimated by the host apparatus 2 according to the first reference signal 130 and the second reference signal 132.

In particular, demodulation will be performed by the host apparatus 2 on the first reference signal 130 and the second reference signal 132 it receives to mitigate the communication interference. For purpose of description, the following parameters will be defined at first:

N: the number of subcarriers, which is labeled to be from 0 to N−1;

$f_d$: the frequency spacing;

$\Delta f_k$: the frequency shift of a subcarrier K;

$\epsilon_k$: normalization of the frequency shift of the subcarrier K, $$\varepsilon_k = \frac{\Delta f_k}{f_d};$$

$X_k$: a complex signal carried by the subcarrier K;

$H_k$: the channel response of the subcarrier K;

$r_n$: the $n^{th}$ sample of the received signal $$r_n = \frac{1}{N}\sum_{k=0}^{N-1} X_k H_k e^{2j\pi \frac{n}{Nf_d}(kf_d + \Delta f_k)} = \frac{1}{N}\sum_{k=0}^{N-1} X_k H_k e^{\frac{j2\pi n(k+\varepsilon_k)}{N}}$$

$R_k$: a signal retrieved from the subcarrier K of the received signal, $$R_k = \sum_{n=0}^{N-1} r_n e^{-\frac{j2\pi nk}{N}}.$$

The host apparatus 2 performs demodulation according to the following formula:

$$R_{k+1} = S(k+1) + \sum_{l=0, l \neq k+1}^{N} I(k+1, l)$$

$$= S(k+1) + I(k+1, k) + \sum_{l=0, l \neq k, k+1}^{N} I(k+1, l) \approx$$

$$\frac{1}{N} H_{k+1}(-A_x) \frac{\sin \pi \varepsilon_x}{\sin \frac{\pi \varepsilon_x}{N}} e^{j \frac{(N-1) \pi \varepsilon_x}{N}} +$$

$$\frac{1}{N} H_k A \cot \frac{-\pi}{N} \sin \pi \varepsilon_x e^{j \frac{(N-1) \varepsilon_x}{N}} + \frac{1}{N} H_k A \sin \pi \varepsilon_x e^{j \left( \frac{(N-1) \varepsilon_x}{N} - \frac{\pi}{2} \right)} +$$

$$\frac{1}{N} \sum_{l=0, l \neq k, k+1}^{N} H_l A_l \cot \frac{\pi(l-k-1)}{N} \sin \pi \varepsilon_l e^{j \frac{(N-1) \pi \varepsilon_l}{N}}$$

where the term in the brace of the third line of this formula represents the communication interference, while the term in the brace of the fourth line of the formula represents communication interference that can be self-cancelled.

Besides, to further cancel the inter-carrier interference, the host apparatus 2 combines the first reference signal 130 and the second reference signal 132 according to the following formula:

$$R_k - R_{k+1} = S(k) - S(k+1) + I(k, k+1) -$$

$$I(k+1, k) + \sum_{l=0, l \neq k, l \neq k+1}^{N} (I(k, l) - I(k+1, l)) \approx$$

$$\frac{1}{N}(H_k + H_{k+1}) A \frac{\sin \pi \varepsilon_k}{\sin \frac{\pi \varepsilon_k}{N}} e^{j \frac{(N-1) \pi \varepsilon_k}{N}} + \frac{1}{N}(H_k - H_{k+1}) A \cot \frac{\pi}{\approx 0 N}$$

$$\sin \pi \varepsilon_k e^{j \frac{(N-1) \pi \varepsilon_k}{N}} + \frac{1}{N}(H_k + H_{k+1}) A \sin \pi \varepsilon_k e^{j \left( \frac{(N-1) \pi \varepsilon_k}{N} - \frac{\pi}{2} \right)} +$$

$$\frac{1}{N} \sum_{l=0, l \neq k, l \neq k+1}^{N} H_l X_l \left( \cot \frac{\pi(l-k)}{N} - \cot \frac{\pi(l-k-1)}{N} \right) \sin \pi \varepsilon_l e^{j \frac{(N-1) \pi \varepsilon_l}{N}} \approx$$

$$\frac{1}{N} H_k \left( \frac{\sin \pi \varepsilon_k}{\sin \frac{\pi \varepsilon_k}{N}} + \frac{\sin \pi \varepsilon_k}{\sin \frac{\pi \varepsilon_k}{N}} \right) A e^{j \frac{(N-1) \pi \varepsilon_k}{N}} + \frac{2}{N} H_k A \sin \pi \varepsilon_k e^{j \left( \frac{(N-1) \pi \varepsilon_k}{N} - \frac{\pi}{2} \right)} +$$

$$\frac{1}{N} \sum_{l=0, l \neq k, l \neq k+1}^{N} H_l A \left( \cot \frac{\pi(l-k)}{N} - \cot \frac{\pi(l-k-1)}{N} \right) \sin \pi \varepsilon_l e^{j \frac{(N-1) \pi \varepsilon_l}{N}}$$

where, the term in the left brace of the fourth line of this formula represents the communication interference, while the term in the right brace of the fourth line of the formula represents communication interference that can be self-cancelled.

Because even if adjacent subcarriers have different channel responses, an estimated minimum root-mean-square value can still be calculated according to the minimum mean-squared error (MMSE) principle, accuracy of the estimated channel response of a certain subcarrier will not be degraded due to difference of the adjacent channel responses. Because channel responses of adjacent subcarriers generally have high correlations, combined benefits can also be obtained through estimation of performances of single subcarriers in addition to decrease in the inter-carrier interference. Accordingly, the host apparatus 2 may further mitigate the interference according to the following formula:

$$X = I * [s_1 \ -s_1 \ s_2 \ -s_2 \ \ldots]^T = \begin{bmatrix} s_1 & 0 & \cdots & & 0 \\ 0 & -s_1 & \ddots & & \\ \vdots & & \ddots & s_2 & \\ & & & -s_2 & 0 \\ 0 & & & 0 & \ddots \end{bmatrix}$$

$$r = Xh + n + ICI = \begin{bmatrix} h_1 s_1 \\ h_2(-s_1) \\ \vdots \\ h_N \end{bmatrix} + \begin{bmatrix} n_1 \\ n_2 \\ \vdots \\ n_N \end{bmatrix} + \begin{bmatrix} ICI_1 \\ ICI_2 \\ \vdots \\ ICI_N \end{bmatrix}$$

To further mitigate the inter-carrier interference, the host apparatus 2 may further operate according to the following formula:

$$r' = \begin{bmatrix} 1 & -1 & & & & \\ & 1 & -1 & & & \\ & & 1 & -1 & & \\ & & & \ddots & \ddots & \\ & & & & \ddots & \ddots \end{bmatrix}_{K} r = Kr$$

$$Kr = \begin{bmatrix} (h_1 + h_2) s_1 \\ (h_3 + h_4) s_2 \\ \vdots \\ (h_{N-1} + h_N) s_{N/2} \end{bmatrix} + \begin{bmatrix} n_1 - n_2 \\ n_3 - n_4 \\ \vdots \\ n_{N-1} - n_N \end{bmatrix} + \begin{bmatrix} ICI_1 - ICI_2 \\ ICI_3 - ICI_4 \\ \vdots \\ ICI_{N-1} - ICI_N \end{bmatrix}$$

where, the term in the brace approaches to zero.

$$h_2 = h_1 + \Delta_1, \ h_4 = h_3 + \Delta_2, \ \ldots, \ h_N = h_{N-1} + \Delta_{N/2}$$

$$r' = \begin{bmatrix} 2h_1 s_1 \\ 2h_3 s_2 \\ \vdots \\ 2h_{N-1} s_{2/N} \end{bmatrix} + \begin{bmatrix} \Delta_1 s_1 \\ \Delta_2 s_2 \\ \vdots \\ \Delta_{N/2} s_{N/2} \end{bmatrix} + \begin{bmatrix} n_1 - n_2 \\ n_3 - n_4 \\ \vdots \\ n_{N-1} - n_N \end{bmatrix} =$$

$$\underbrace{\begin{bmatrix} s_1 & & & \\ & s_2 & & \\ & & \ddots & \\ & & & s_{N/2} \end{bmatrix}}_{X_t} * \left( 2 * \underbrace{\begin{bmatrix} h_1 \\ h_3 \\ \vdots \\ h_{N-1} \end{bmatrix}}_{h_t} + \underbrace{\begin{bmatrix} \Delta_1 \\ \Delta_2 \\ \vdots \\ \Delta_{N/2} \end{bmatrix}}_{\Delta} \right) + \underbrace{\begin{bmatrix} n_1 - n_2 \\ n_3 - n_4 \\ \vdots \\ n_{N-1} - n_N \end{bmatrix}}_{n_t}$$

$$h_t = \begin{bmatrix} h_1 \\ h_3 \\ \vdots \\ h_{N-1} \end{bmatrix} = \underbrace{\begin{bmatrix} 1 & 0 & & & & \\ & 1 & 0 & & & \\ & & 1 & 0 & & \\ & & & \ddots & \ddots & \\ & & & & 1 & 0 \end{bmatrix}}_{T} \underbrace{\begin{bmatrix} h_1 \\ h_2 \\ \vdots \\ h_N \end{bmatrix}}_{h} = Th$$

$$r' = 2 X_t (h_t + \Delta) + n_t$$

This embodiment estimates $h_t$ according to the MMSE principle, which is expressed by the following formula:

$$\tilde{h}_t = R_{h_t r'} R_{r' r'}^{-1} * r'$$

$$R_{h_t r'} = E[h_t r'^*] =$$

$$E[2 h_t (h_t^* + \Delta^*) X_t^* + h_t n_t^*] = 2 * E[h_t h_t^*] X_t^* + 2 * E[h_t \Delta^*] X_t^* + \underline{E[h_t n_t^*]}$$

where, the portion in the brace of the above formula is equal to zero in the Additive White Gaussian Noise (AWGN) model.

$$E[h_t h_t^*] = TE[hh^*]T^* = TR_{hh}T^*$$

$$\Delta = -K^*h$$

$$E[h_t \Delta^*] = -E[h_t h^* K^*] = -1 * TR_{hh}K^*$$

$$R_{h_t r'} = 2*TR_{hh}T^*X_t^* - 2*TR_{hh}K^*X_t^* = 2TR_{hh}(T^*-K^*)X_t^*$$

$$R_{r'r'} = E[(2X_t(h_t+\Delta)+n_t)*(2(h_t^*+\Delta^*)X_t^*+n_t^*)] = 4X_tE[(h_t+\Delta)(h_t^*+\Delta^*)]X_t^* + E[n_t n_t^*]$$

$$E[(h_t+\Delta)(h_t^*+\Delta^*)] = E[h_t h_t^*] + E[h_t \Delta^*] + E[\Delta h_t^*] + E[\Delta \Delta^*]$$

$$E[\Delta h_t^*] = -KE[hh^*]T^*$$

$$E[\Delta \Delta^*] = KR_{hh}K^*$$

$$E[n_t n_t^*] = mI$$

where, m represents the noise power of the AWGN model.

$$R_{r'r'} = 4*X_t*(TR_{hh}T^* - TR_{hh}K^* - KE[hh^*]T^* + KR_{hh}K^*)X_t^* + mI = KXR_{hh}X^*K^*$$

Next, by substituting $R_{h_t r'}$ into $\tilde{h}_t = R_{h_t r'} R_{r'r'}^{-1} * r$, the estimated value $\tilde{h}_t$ can be obtained. $h_2, h_4, \ldots$ may also be estimated in the same way, and will not be further described herein.

What described above is an optimized estimation method, which takes slight difference between highly correlated channels. If it is assumed that the highly correlated channels may be considered to be identical to each other, then a suboptimal MMSE estimation method can still be obtained, which is expressed by the following formula:

$$X = I * [s_1 \ -s_1 \ s_2 \ -s_2 \ \ldots]^T = \begin{bmatrix} s_1 & 0 & \cdots & 0 \\ 0 & -s_1 & \ddots & \\ \vdots & \ddots & s_2 & \\ & & -s_2 & 0 \\ 0 & & 0 & \ddots \end{bmatrix}$$

$$X = I * [s_1 \ -s_1 \ s_2 \ -s_2 \ \ldots]^T = \begin{bmatrix} s_1 & 0 & \cdots & 0 \\ 0 & -s_1 & \ddots & \\ \vdots & \ddots & s_2 & \\ & & -s_2 & 0 \\ 0 & & 0 & \ddots \end{bmatrix}$$

To cancel the inter-carrier interference, the host apparatus 2 further performs the following operation:

$$r' = \underbrace{\begin{bmatrix} 1 & -1 & & & \\ & 1 & -1 & & \\ & & 1 & -1 & \\ & & & \cdots & \cdots \\ & & & & \cdots & \cdots \end{bmatrix}}_{K} r = Kr$$

$$Kr = \begin{bmatrix} (h_1+h_2)s_1 \\ (h_3+h_4)s_2 \\ \vdots \\ (h_{N-1}+h_N)s_{N/2} \end{bmatrix} + \begin{bmatrix} n_1-n_2 \\ n_3-n_4 \\ \vdots \\ n_{N-1}-n_N \end{bmatrix} + \underbrace{\begin{bmatrix} ICI_1-ICI_2 \\ ICI_3-ICI_4 \\ \vdots \\ ICI_{N-1}-ICI_N \end{bmatrix}}$$

where, the portion in the brace of the above formula is substantially equal to zero.

$$r' = \underbrace{\begin{bmatrix} s_1 & & & \\ & s_2 & & \\ & & \ddots & \\ & & & s_{N/2} \end{bmatrix}}_{X_t} * \left( 2 * \underbrace{\begin{bmatrix} h_1+h_2 \\ h_3+h_4 \\ \vdots \\ h_{N-1}+h_N \end{bmatrix}}_{h_x} \right) + \underbrace{\begin{bmatrix} n_1-n_2 \\ n_3-n_4 \\ \vdots \\ n_{N-1}-n_N \end{bmatrix}}_{n_t}$$

$$r' = 2X_t h_x + n_t$$

$$h_x = \begin{bmatrix} h_1+h_2 \\ h_3+h_4 \\ \vdots \\ h_{N-1}+h_N \end{bmatrix} = \begin{bmatrix} h_1+h_1 \\ h_3+h_3 \\ \vdots \\ h_{N-1}+h_{N-1} \end{bmatrix} + \begin{bmatrix} \Delta_1 \\ \Delta_2 \\ \vdots \\ \Delta_{N/2} \end{bmatrix} \approx 2 \begin{bmatrix} h_1 \\ h_3 \\ \vdots \\ h_{N-1} \end{bmatrix}$$

This embodiment estimates $h_t$ according to the MMSE principle, which is expressed by the following formula:

$$\tilde{h}_x = R_{h_x r'} R_{r'r'}^{-1} * r'$$

$$R_{h_x r'} = E[h_x r'^*] = E[2h_x h_x^* X_t^* + h_x n_t^*] = 2 * E[h_x h_x^*]X_t^* + \underline{E[h_x n_t^*]}$$

where, the portion in the brace of the above formula is equal to zero in the Additive White Gaussian Noise (AWGN) model.

$$G = \begin{bmatrix} 1 & 1 & & & & \\ & & 1 & 1 & & \\ & & & & 1 & 1 \\ & & & & \cdots & \cdots \\ & & & & & & 1 & 1 \end{bmatrix}, h = \begin{bmatrix} h_1 \\ h_2 \\ \vdots \\ h_N \end{bmatrix}$$

$$E[h_x h_x^*] = E[Ghh^*G^*] = GE[hh^*]G^* = GR_{hh}G^*$$

$$R_{h_x r'} = 2 * GR_{hh}G^* X_t^*$$

$$R_{r'r'} = E[(2X_t h_x + n_t)(2h_x^* X_t^* + n_t^*)] = 4X_t E[h_x h_x^*]X_t^* + mI$$

where, m represents the noise power of the AWGN model.

Figure 3:
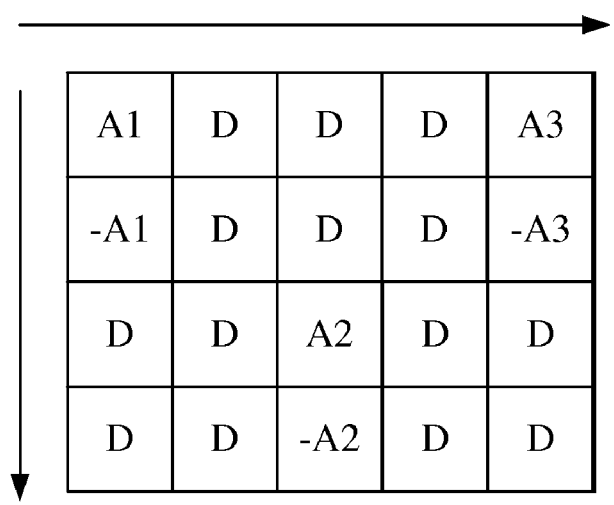
FIG. 3 is a schematic view illustrating arrangement of resources of the wireless network frame according to the first example embodiment.

Furthermore, arrangement of resources of the wireless network frame may also be as shown in FIG. 3. Like the arrangement of resources shown in FIG. 2, in FIG. 3, the horizontal axis represents the time, the vertical axis represents the frequency, and through division of the time and the frequency, each small check in the wireless network frame represents a subcarrier. In FIG. 3, A1 and −A1 also represent the first reference signal 130 and the second reference signal 132 respectively, while A2 and −A2 as well as A3 and −A3 may be reference signals transmitted by other signal transmission apparatuses in the wireless network. Arrangement of A2 and −A2 as well as A3 and −A3 is just the same as that of the first reference signal 130 and the second reference signal 132, and thus will not be further described herein. Small checks denoted by D in FIG. 3 represent subcarriers for carrying data.

Figure 4:
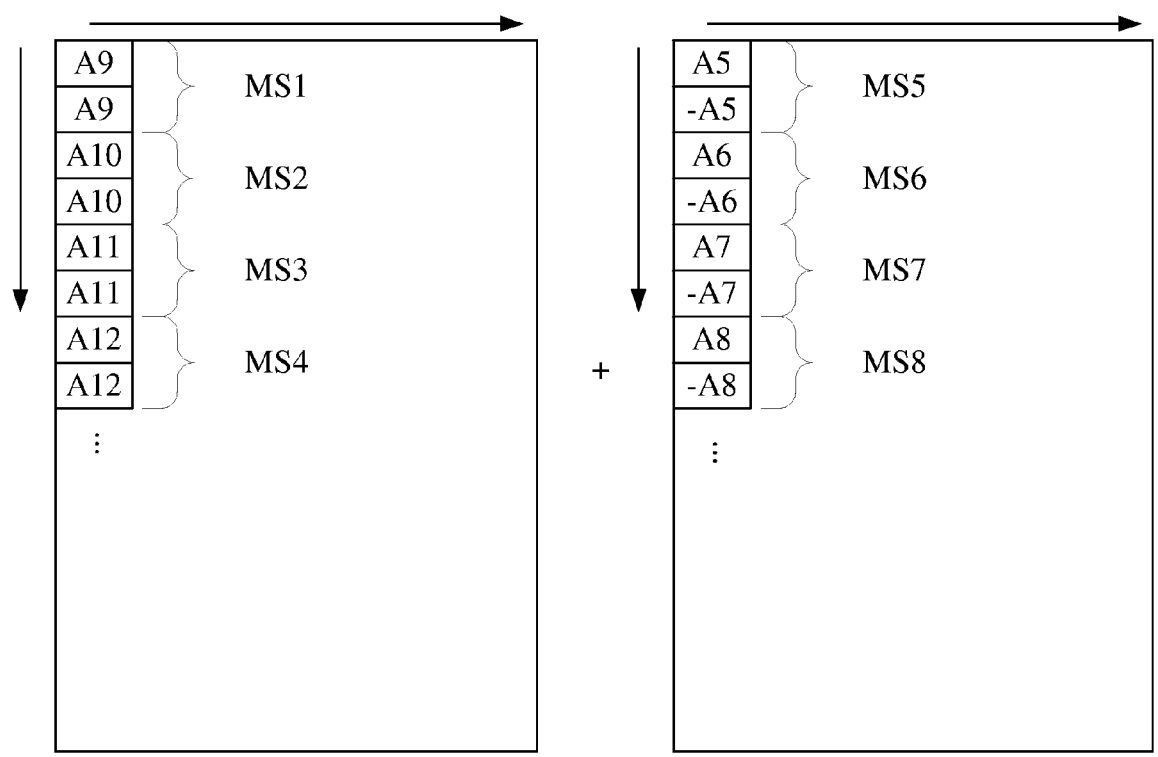
FIG. 4 is a schematic view illustrating arrangement of resources of the wireless network frame according to the first example embodiment.

Additionally, to make full use of the wireless network resources, arrangement of resources of the wireless network frame may also be as shown in FIG. 4. Like the arrangement of resources shown in FIG. 2, in FIG. 4, the horizontal axis represents the time, the vertical axis represents the frequency, and through division of the time and the frequency, each small check in the wireless network frame represents a subcarrier.

In FIG. 4, A5 and −A5 represent respectively a third reference signal 30 and a fourth reference signal 32 that is antipodal to the third reference signal 30, which are generated by the signal transmission apparatus 3 and transmitted via the first subcarrier and the second subcarrier respectively; and reference signals A6 and −A6, A7 and −A7 as well as A8 and −A8 may be transmitted by other signal transmission apparatuses in the wireless network.

The signal transmission apparatus 1 may learn from the wireless network frame information 110 that the first subcarrier and the second subcarrier have been allocated to the third reference signal 30 and the fourth reference signal 32 generated by the signal transmission apparatus 3. Therefore, the microprocessor 13 of the signal transmission apparatus 1 will, according to the wireless network frame information 110, arrange a fifth reference signal 134 (i.e., A9 in FIG. 4) into the first subcarrier and the second subcarrier, and then the fifth reference signal 134 is transmitted by the transceiving module 15 via the first subcarrier and the second subcarrier so that the host apparatus 2 can estimate conditions of a second communication channel between the host apparatus 2 and the signal transmission apparatus 3 according to both the third reference signal 30 and the fourth reference signal 32 and estimate conditions of the first communication channel between the host apparatus 2 and the signal transmission apparatus 1 according to the fifth reference signal 134 simultaneously.

Specifically, the arrangement of resources of the wireless network frame shown in FIG. 4 differs from that of FIG. 2 in that, a single subcarrier may carry reference signals transmitted by different signal transmission apparatuses (i.e., network resources of the same frequency at the same time are used). Taking the signal transmission apparatus 1 as an example, the fifth reference signal 134 it generates (i.e., A9 in FIG. 4) may be arranged into the first subcarrier that already carries the third reference signal 30 (i.e., A5 in FIG. 4) and the second subcarrier that already carries the fourth reference signal 32 (i.e., −A5 in FIG. 4). In this way, a single subcarrier can carry reference signals generated by different signal transmission apparatuses simultaneously, which will remarkably improve the carrying efficiency of the single subcarrier. Additionally, reference signals A10 as well as A6 and −A6, A11 as well as A7 and −A7, and A12 as well as A8 and −A8 may also be arranged in the same way as that of the third reference signal 30 and the fourth reference signal 32 as well as the fifth reference signal 134, and thus will not be further described herein.

If the third reference signal 30 and the fourth reference signal 32 as well as the fifth reference signal 134 are received by the host apparatus 2 according to the resource arrangement shown in FIG. 4, the host apparatus 2 will perform the following processing:

$$R_k = H_k^x A_x + H_k^y A_y + ICI_k$$

$$R_{k+1} = -H_{k+1}^x A_x + H_{k+1}^y A_y + ICI_{k+1}$$

where, $R_k$ represents a signal retrieved from the first subcarrier, $R_{k+1}$ represents a signal retrieved from the second subcarrier, $H_k^x$ represents a channel response, that is occupied by the third reference signal 30 of the signal transmission apparatus 3, of the first subcarrier, $H_k^y$ represents a channel response, that is occupied by the fifth reference signal 134 of the signal transmission apparatus 1, of the first subcarrier, $A_x$ represents the first subcarrier, $A_y$ represents the second subcarrier, $ICI_k$ represents the inter-carrier interference of the first subcarrier, $-H_{k+1}^x$ represents a channel response, that is occupied by the fourth reference signal 32 of the signal transmission apparatus 3, of the second subcarrier, and $H_{k+1}^y$ represents a channel response, that is occupied by the fifth reference signal 134 of the signal transmission apparatus 1, of the second subcarrier. Because $R_k$ and $R_{k+1}$ are adjacent subcarriers, the following relationships can be obtained: $H_{k+1}^x \cong H_k^x = H_{k+1}^y \cong H_k^y = H_y$. Accordingly, the following relationships can be obtained:

$$\begin{bmatrix} R_k \\ R_{k+1} \end{bmatrix} \approx H_x A_x \begin{bmatrix} 1 \\ -1 \end{bmatrix} + H_y A_y \begin{bmatrix} 1 \\ 1 \end{bmatrix} + \begin{bmatrix} ICI_k \\ ICI_{k+1} \end{bmatrix}$$

As may be seen clearly from the above formula, except the ICI term, a sum of the first two terms in this formula is equal to a linear combination of the two orthogonal base $$\begin{bmatrix} 1 \\ -1 \end{bmatrix} \text{ and } \begin{bmatrix} 1 \\ 1 \end{bmatrix}.$$

Hence, $H_x$ may be estimated through the following formula:

$$\begin{bmatrix} 1 & -1 \end{bmatrix} \begin{bmatrix} R_k \\ R_{k+1} \end{bmatrix} \approx 2H_x A_x + ICI_k - ICI_{k+1}$$

Also, $H_y$ may be estimated through the following formula:

$$\begin{bmatrix} 1 & 1 \end{bmatrix} \begin{bmatrix} R_k \\ R_{k+1} \end{bmatrix} \approx 2H_y A_y + ICI_k + ICI_{k+1}$$

Note that, subsequent to this step, the MMSE principle set forth above may also be used to estimate channel conditions of different signal transmission apparatuses and compensate for the drawbacks caused when adjacent channels are not identical to each other.

To make full use of the wireless network resources, arrangement of resources of the wireless network frame may also be as shown in FIG. 5. Like the arrangement of resources shown in FIG. 3, in FIG. 5, the horizontal axis represents the time, the vertical axis represents the frequency, and through division of the time and the frequency, each small check in the wireless network frame represents a subcarrier. In FIG. 5, small checks labeled by D are subcarriers for carrying data; A5 and −A5 represent respectively the third reference signal 30 and the fourth reference signal 32 that is antipodal to the third reference signal 30, which are generated by the signal transmission apparatus 3 and transmitted via the first subcarrier and the second subcarrier respectively; and reference signals A6 and −A6, A7 and −A7 as well as A8 and −A8 may be transmitted by other signal transmission apparatuses in the wireless network.

The signal transmission apparatus 1 may learn from the wireless network frame information 110 that the first subcarrier and the second subcarrier have been allocated to the third reference signal 30 and the fourth reference signal 32 generated by the signal transmission apparatus 3. Therefore, the microprocessor 13 of the signal transmission apparatus 1 will, according to the wireless network frame information 110, arrange the fifth reference signal 134 (i.e., A9 in FIG. 4) that it generates into the first subcarrier and the second subcarrier, and then the fifth reference signal 134 is transmitted by the transceiving module 15 via the first subcarrier and the second subcarrier so that the host apparatus 2 can estimate conditions of a second communication channel between the host apparatus 2 and the signal transmission apparatus 3 according to both the third reference signal 30 and the fourth reference signal 32 and estimate conditions of the first communication channel between the host apparatus 2 and the signal transmission apparatus 1 according to the fifth reference signal 134 simultaneously.

Specifically, the arrangement of resources of the wireless network frame shown in FIG. 5 differs from that of FIG. 3 in that, a single subcarrier may carry reference signals transmitted by different signal transmission apparatuses (i.e., network resources of the same frequency at the same time are used). Taking the signal transmission apparatus 1 as an example, the fifth reference signal 134 it generates (i.e., A9 in FIG. 5) may be arranged into the first subcarrier that already carries the third reference signal 30 (i.e., A5 in FIG. 5) and the second subcarrier that already carries the fourth reference signal 32 (i.e., −A5 in FIG. 5). In this way, a single subcarrier can carry reference signals generated by different signal transmission apparatuses simultaneously, which will remarkably improve the carrying efficiency of the single subcarrier. Additionally, reference signals A10 as well as A6 and −A6, A11 as well as A7 and −A7 may also be arranged in the same way as that of the third reference signal 30 and the fourth reference signal 32 as well as the fifth reference signal 134, and thus will not be further described herein.

Furthermore, a cyclic sequence relationship may exist between the first reference signal 130 and the second reference signal 132, and the transceiving interface 15 is further configured to transmit the first reference signal 130 and the second reference signal 132 via the first subcarrier and the second subcarrier respectively so that the host apparatus 2 can estimate conditions of the first communication channel between the host apparatus 2 and the signal transmission apparatus 1 according to the first reference signal 130 and the second reference signal 132.

Figure 6:
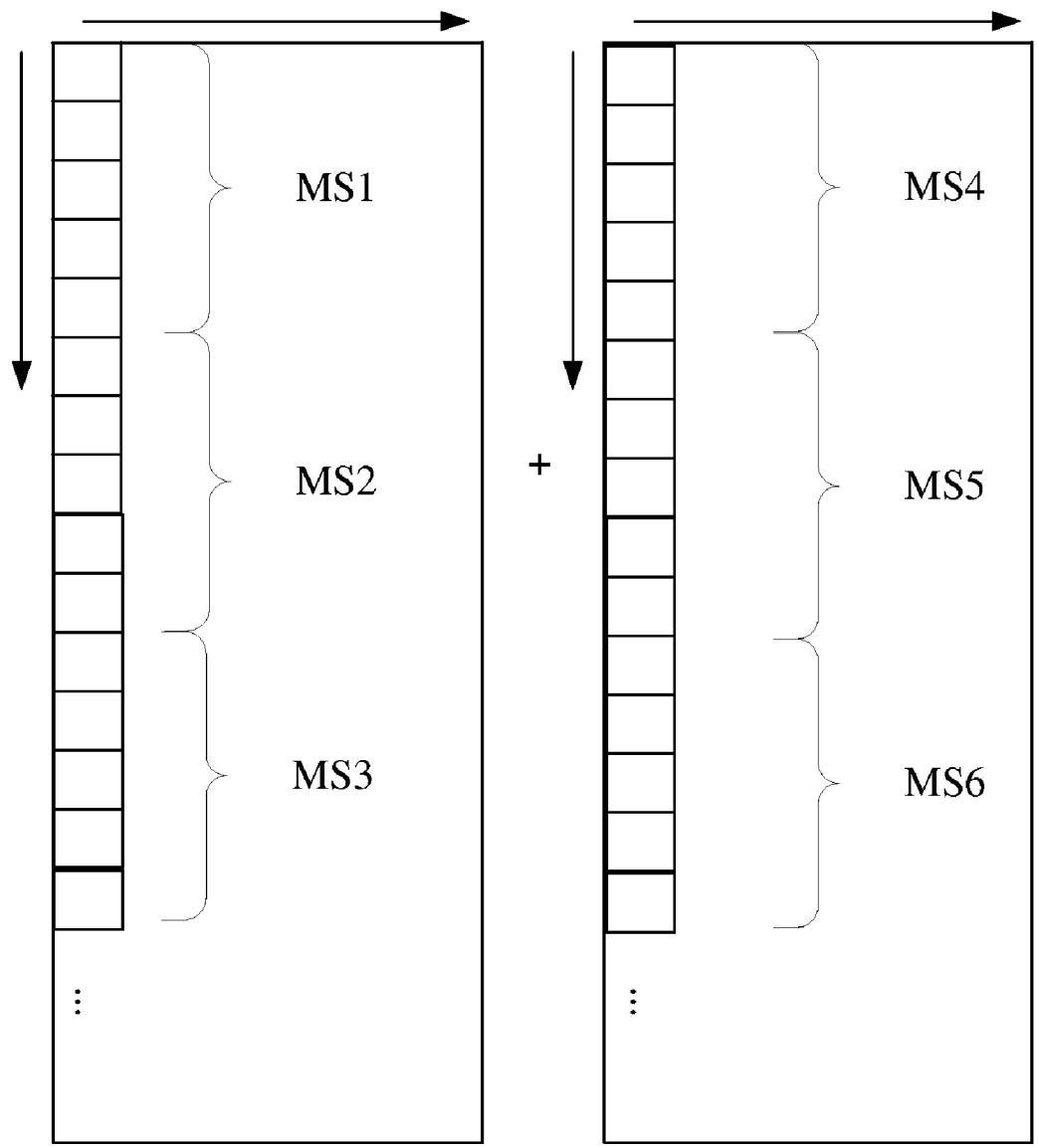
FIG. 6 is a schematic view illustrating arrangement of resources of the wireless network frame according to the first example embodiment.

In particular, arrangement of resources of the wireless network frame according to a cyclic sequence relationship may be as shown in FIG. 6. In FIG. 6, for the reference signals, a sequence of a length K is used for channel estimation. In this example, for the signal transmission apparatus 1, the reference signals are arranged along the subcarriers in a cyclic manner, and the cyclic sequence relationship correlates well (e.g., orthogonal or approximately orthogonal) with the cyclic shift. For example, the cyclic sequence relationship may be a Zadoff-Chu cyclic sequence relationship, a PN code or a Gold code; alternatively, a sequence of any length that has such properties may also be found manually. If the reference signals are arranged into the subcarriers following the Zadoff-Chu cyclic sequence relationship, then after receiving the reference signals, the host apparatus 2 may perform an inner product operation thereon and then apply the estimation method described above to effectively mitigate the inter-carrier interference.

More specifically, in this embodiment, a cyclic sequence k of a length K may be used as the reference signals for use in channel estimation. In this case, for the signal transmission apparatus 1, the reference signals are arranged along the subcarriers in a cyclic way. The cyclic sequence K correlates well (e.g., orthogonal or approximately orthogonal to) with the cyclic shift. Additionally, a set of K cyclic sequence is formed by the cyclic sequence K and other different cyclic sequences. When channel responses of different antennas (m antennas, for example) are to be estimated on a same group of subcarriers (as shown in FIG. 6), m groups of cyclic sequences out of the set of K cyclic sequences may be allocated to the different antennas for use as reference signals.

As described above, if m=2, then two groups of sequences may be taken out of the set of K cyclic sequences. The sequences taken must be such that, except that the inter-carrier interference corresponding to the distances K+Kx,K−1+Kx, . . . , floor(K/2)+Kx cannot be cancelled, other inter-carrier interference can all be cancelled (x=0, 1, 2, . . . , N−1); and so on; and except that the inter-carrier interference corresponding to the distances K+Kx, . . . , floor(K/m)+Kx cannot be cancelled, other inter-carrier interference can all be cancelled. For example, assume that the set of K cyclic sequence set is [c1 c2 c3 c4 c5],[c2 c3 c4 c5 c1],[c3 c4 c5 c1 c2],[c4 c5 c1 c2 c3], [c5 c1 c2 c3 c4] and the five sequences are orthogonal to or approximately orthogonal to each other; then if m=2, the two groups of sequences taken out of the set of K cyclic sequences may be {[c1 c2 c3 c4 c5],[c3 c4 c5 c1 c2]},{[c1 c2 c3 c4 c5],[c4 c5 c1 c2 c3]}.

If m≧2, floor(K/m) may be 0. In this case, it is impossible to cancel the inter-carrier interference, but m cyclic sequences that result in minimum inter-carrier interference can still be found according to the following principle:

any two of the m cyclic sequences can be such that as many as possible of cyclic sequence pairs have relationships of cyclic shifting by ±floor(K/2) relative to each other;

any three of the m cyclic sequences can be such that as many as possible of cyclic sequence pairs have relationships of cyclic shifting by ±floor(K/3) relative to each other;

any (m−1) of the m cyclic sequences can be such that as many as possible of cyclic sequence pairs have relationships of cyclic shifting by ±floor(K/(m−1)) relative to each other.

The aforesaid principle may be summarized as the following steps:

Step 1: selecting one cyclic sequence S from the cyclic sequence set

Step 2: listing two cyclic sequences S'1 and S'2 that have a relationship of cyclic shifting by ±floor((K−2)/2) with the cyclic sequence S, with a set of the two sequences being represented by S' (S'1 represents cyclic shifting by +floor((K−2)/2), and S'2 represents cyclic shifting by −floor((K−2)/2));

Step 3: listing two cyclic sequences S"1 and S"2 that have a relationship of cyclic shifting by ±floor((K−3)/3) with the cyclic sequence S, with a set of the two sequences being represented by S" (S"1 represents cyclic shifting by +floor((K−3)/3), and S"2 represents cyclic shifting by −floor((K−3)/3));

Step 4: continuing in the same way;

Step 5: arranging the above cyclic sequences in the order of S, S'1,S"2,S'''1, . . . , S'2,S"1,S'''2;

Step 6: if there are m cyclic sequences in total, then m cyclic sequences are selected sequentially in the order of the above sequence.

For the aforesaid example, K=5, m=3, and it is assumed that S'={S'1:[c3 c4 c5 c1 c2],S'2[c4 c5 c1 c2 c3]}, S"={S"1: [c2 c3 c4 c5 c1],S"2:[c5 c1 c2 c3 c4]}. Hence, S, S' and S" are selected as a set of cyclic sequences.

Figure 7:
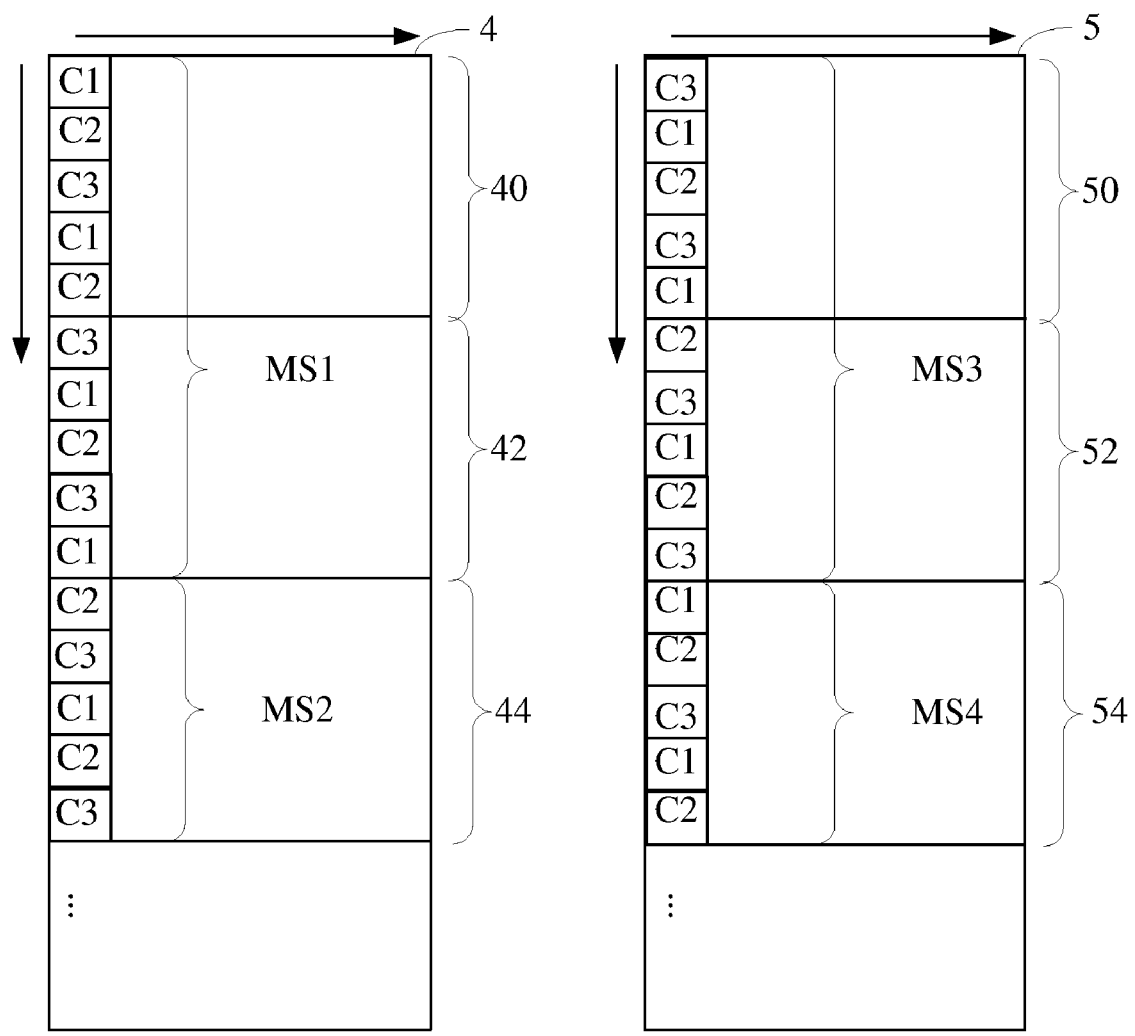
FIG. 7 is a schematic view illustrating arrangement of resources of the wireless network frame according to the first example embodiment.

To improve the carrying efficiency of the subcarriers, resource arrangement of the cyclic sequence relationship may be as shown in FIG. 7. In particular, FIG. 7 depicts resource arrangement, which exhibits a cyclic sequence relationship, of a cell 4 and a cell 5. The cell 4 comprises a subchannel 40, a subchannel 42 and a subchannel 44, while the cell 5 comprises a subchannel 50, a subchannel 52 and a subchannel 54. Each of the subchannels comprises a plurality of subcarriers.

A signal transmission apparatus MS1 included in the cell 4 arranges reference signals into the subcarriers according to a cyclic sequence relationship (i.e., C1C2C3), and a signal transmission apparatus MS3 included in the cell 5 arranges reference signals into the subcarriers according to a cyclic sequence relationship (i.e., C3C1C2), so as to mitigate signal interference between the cells.

In particular, in an OFDM(A) wireless network, a certain OFDM symbol will be set as a pilot position. If a signal transmission apparatus is allocated an OFDM block (having several consecutive subcarriers and OFDM symbols) for data transmission, the signal transmission apparatus will arrange reference signals for channel estimation use by disposing a sequence of a length K in a cyclic way at a position of the OFDM symbol corresponding to the pilot.

The sequence has the following characteristics:
  this sequence itself correlates well with its cyclic shift (e.g., orthogonal or approximately orthogonal to each other);
  this sequence may be one set, and correlates well with each other;
  this sequence may be a Zadoff-Chu sequence or other sequences with similar properties.

Additionally, within a same cell, only one or several sequences in a set may be used as the pilot sequence(s) (i.e., C1C2C3 or C3C1C2). For different cells, different sequences may be used. The purpose of arranging reference signals in this way is to mitigate the inter-carrier interference of pilots of the cell itself to each other. Also, because pilot sequences of different cells are selected to correlate well with each other, interference between the cells can be cancelled.

It shall be noted that, all the channel estimation approaches described above are applicable to both uplink channel estimation and downlink channel estimation. This will be readily understood by those of ordinary skill in the art and, thus, will not be further described herein.

Figure 8:
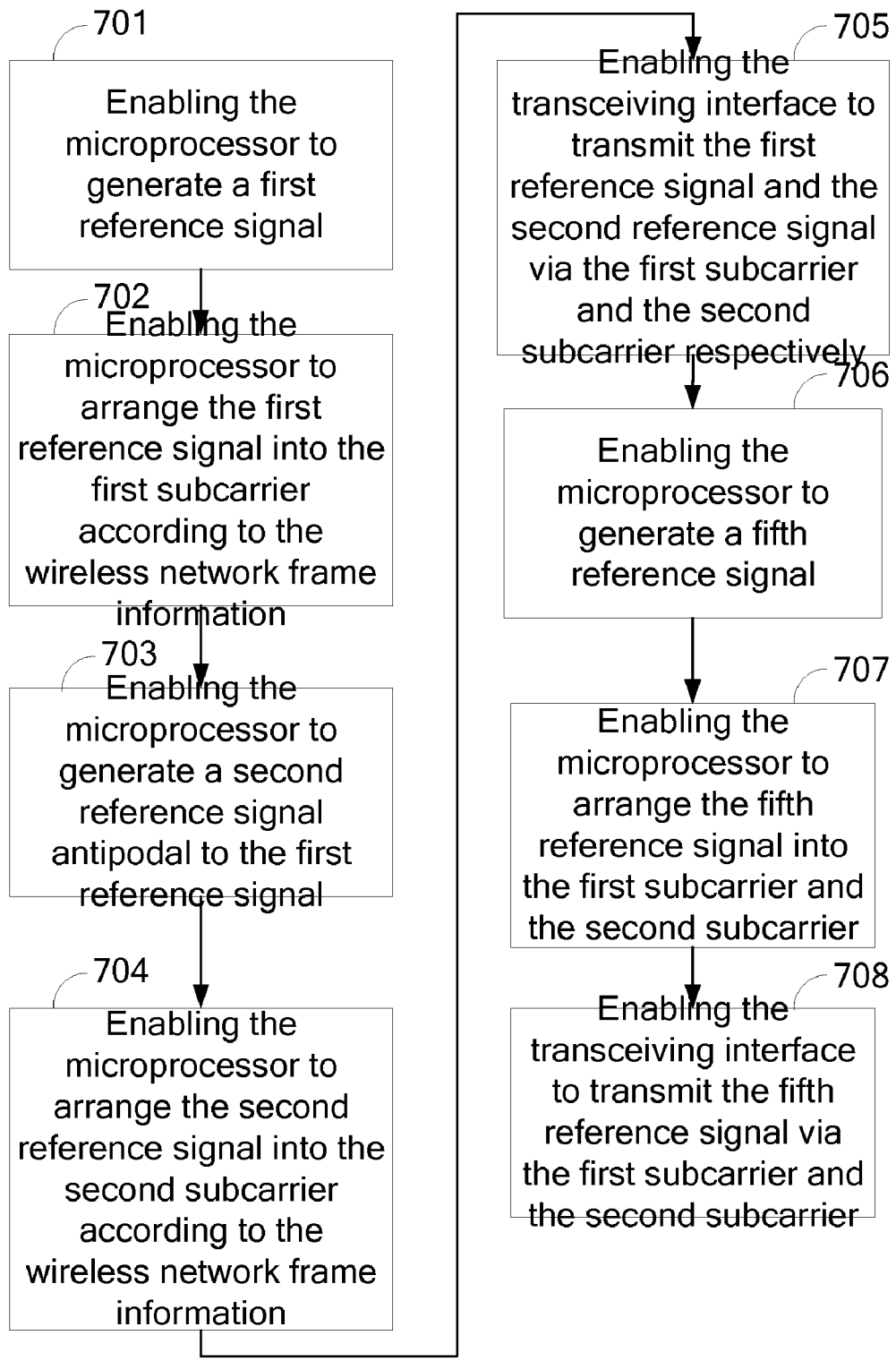
FIG. 8 is a flowchart of a second example embodiment of the present invention.

A second example embodiment of the present invention is shown in FIG. 8, which is a flowchart of a transmission method for the signal transmission apparatus 1 of the first embodiment. The signal transmission apparatus 1 is adapted for use in a wireless network comprising the host apparatus 2, and comprises a storage 11, a microprocessor 13 and a transceiving interface 15. The microprocessor 13 is electrically connected to the storage 11 and the transceiving interface 15 respectively. The storage 11 is configured to store wireless network frame information 110 that records arrangement of a plurality of subcarriers contained in a wireless network frame. The plurality of subcarriers includes a first subcarrier and a second subcarrier adjacent to the first subcarrier.

Furthermore, the transmission method described in the second example embodiment may also be implemented by a computer storage medium. When the computer storage medium is loaded into the signal transmission apparatus via a computer and a plurality of codes contained in the computer storage medium is executed, the transmission method described in the second embodiment can be accomplished. This computer storage medium may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Firstly, step 701 is executed to enable the microprocessor 13 to generate a first reference signal 130. Then, step 702 is executed to enable the microprocessor 13 to arrange the first reference signal 130 into the first subcarrier according to the wireless network frame information 110. Next, step 703 is executed to enable the microprocessor 13 to generate a second reference signal 132 antipodal to the first reference signal 130, and step 704 is executed to enable the microprocessor 13 to arrange the second reference signal 132 into the second subcarrier according to the wireless network frame information 110.

Subsequently, step 705 is executed to enable the transceiving interface 15 to transmit the first reference signal 130 and the second reference signal 132 via the first subcarrier and the second subcarrier respectively so that the host apparatus 2 can estimate conditions of the first communication channel between the host apparatus 2 and the signal transmission apparatus 1 according to the first reference signal 130 and the second reference signal 132. How the channel conditions are estimated is just the same as what described in the first embodiment and, thus, will not be further described herein.

It shall be noted that, the first reference signal 130 may present a cyclic sequence relationship with the second reference signal 132, and the host apparatus 2 may also estimate conditions of the first communication channel between the host apparatus 2 and the signal transmission apparatus 1 according to the cyclic sequence relationship between the first reference signal 130 and the second reference signal 132. How the channel conditions are estimated is just the same as what described in the first embodiment and, thus, will not be further described herein.

In case the wireless network comprises another signal transmission apparatus 3 and the signal transmission apparatus 3 transmits a third reference signal 30 and a fourth reference signal 32 antipodal to the third reference signal 30 via the first subcarrier and the second subcarrier respectively, then step 706 is executed to enable the microprocessor 13 to generate a fifth reference signal 134. Then step 707 is executed to enable the microprocessor 13 to arrange the fifth reference signal 134 into the first subcarrier and the second subcarrier. Afterwards, step 708 is executed to enable the transceiving interface 15 to transmit the fifth reference signal 134 via the first subcarrier and the second subcarrier so that the host apparatus 2 can estimate conditions of a second communication channel between the host apparatus 2 and the signal transmission apparatus 3 according to the third reference signal 30 and the fourth reference signal 32 and further estimate conditions of the first communication channel between the host apparatus 2 and the signal transmission apparatus 1 according to the fifth reference signal 134. How the channel conditions are estimated is just the same as what described in the first embodiment and, thus, will not be further described herein.

In addition to the aforesaid steps, the second example embodiment can also execute all the operations and functions set forth in the first example embodiment. How the second embodiment executes these operations and functions will be readily appreciated by those of ordinary skill in the art based on the explanation of the first embodiment, and thus will not be further described herein.

According to the above descriptions, by use of reference signals that are in an antipodal relationship or in a cyclic sequence relationship, the present invention can effectively mitigate the inter-carrier interference so that communication channels of the wireless network can be estimated accurately to improve reliability of subsequent signal transmissions. Thereby, shortcomings of the prior art are effectively addressed.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A signal transmission apparatus for use in a wireless network, the wireless network comprising a host apparatus, the signal transmission apparatus comprising:
   a storage, being configured to store wireless network frame information recording an arrangement of a plurality of subcarriers included in a wireless network frame, the plurality of subcarriers including a first subcarrier and a second subcarrier adjacent to the first subcarrier;
   a microprocessor electrically connected to the storage, being configured to generate a first reference signal and arrange the first reference signal into the first subcarrier according to the wireless network frame information, and further configured to generate a second reference signal antipodal to the first reference signal and arrange the second reference signal into the second subcarrier according to the wireless network frame information; and
   a transceiving interface, being configured to transmit the first reference signal and the second reference signal via the first subcarrier and the second subcarrier respectively so that the host apparatus may estimate conditions of a first communication channel between the host apparatus and the signal transmission apparatus according to the first reference signal and the second reference signal;
   wherein the wireless network comprises another signal transmission apparatus transmitting a third reference signal and a fourth reference signal antipodal to the third reference signal via the first subcarrier and the second subcarrier respectively, the microprocessor is further configured to generate a fifth reference signal and arrange the fifth reference signal into the first subcarrier and the second subcarrier according to the wireless network frame information, and the transceiving interface is further configured to transmit the fifth reference signal via the first subcarrier and the second subcarrier so that the host apparatus may estimate conditions of a second communication channel between the host apparatus and the another signal transmission apparatus according to the third reference signal and the fourth reference signal and further estimate conditions of the first communication channel between the host apparatus and the signal transmission apparatus according to the fifth reference signal.

2. A transmission method for a signal transmission apparatus, the signal transmission apparatus being adapted for use in a wireless network comprising a host apparatus, and comprising a storage, a microprocessor and a transceiving interface, the microprocessor being electrically connected to the storage and the transceiving interface respectively, the storage being configured to store wireless network frame information recording arrangement of a plurality of subcarriers contained in a wireless network frame, the plurality of subcarriers including a first subcarrier and a second subcarrier adjacent to the first subcarrier, the transmission method comprising the steps of:
   (a) enabling the microprocessor to generate a first reference signal;
   (b) enabling the microprocessor to arrange the first reference signal into the first subcarrier according to the wireless network frame information;
   (c) enabling the microprocessor to generate a second reference signal antipodal to the first reference signal;
   (d) enabling the microprocessor to arrange the second reference signal into the second subcarrier according to the wireless network frame information; and
   (e) enabling the transceiving interface to transmit the first reference signal and the second reference signal via the first subcarrier and the second subcarrier respectively so that the host apparatus may estimate conditions of a first communication channel between the host apparatus and the signal transmission apparatus according to the first reference signal and the second reference signal;
   wherein the wireless network comprises another signal transmission apparatus transmitting a third reference signal and a fourth reference signal antipodal to the third reference signal via the first subcarrier and the second subcarrier respectively, the transmission method further comprises the steps of:
      enabling the microprocessor to generate a fifth reference signal;
      enabling the microprocessor to arrange the fifth reference signal into the first subcarrier and the second subcarrier; and
      enabling the transceiving interface to transmit the fifth reference signal via the first subcarrier and the second subcarrier so that the host apparatus may estimate conditions of a second communication channel between the host apparatus and the another signal transmission apparatus according to the third reference signal and the fourth reference signal and further estimate conditions of the first communication channel between the host apparatus and the signal transmission apparatus according to the fifth reference signal.

3. A non-transitory computer storage medium storing a program for executing a transmission method for use in a signal transmission apparatus, the signal transmission apparatus comprising a storage, a microprocessor and a transceiving interface, the microprocessor being electrically connected to the storage and the transceiving interface respectively, the storage being configured to store wireless network frame information recording arrangement of a plurality of subcarriers contained in a wireless network frame, the plurality of subcarriers including a first subcarrier and a second subcarrier adjacent to the first subcarrier, the program comprising the following codes:
   a code A for enabling the microprocessor to generate a first reference signal;
   a code B for enabling the microprocessor to arrange the first reference signal into the first subcarrier according to the wireless network frame information;
   a code C for enabling the microprocessor to generate a second reference signal antipodal to the first reference signal;
   a code D for enabling the microprocessor to arrange the second reference signal into the second subcarrier according to the wireless network frame information; and
   a code E for enabling the transceiving interface to transmit the first reference signal and the second reference signal via the first subcarrier and the second subcarrier respectively so that the host apparatus may estimate conditions of a first communication channel between the host apparatus and the signal transmission apparatus according to the first reference signal and the second reference signal;
   wherein the wireless network comprises another signal transmission apparatus transmitting a third reference signal and a fourth reference signal antipodal to the third reference signal via the first subcarrier and the second subcarrier respectively, the program further comprises the following codes:

a code F for enabling the microprocessor to generate a fifth reference signal;

a code G for enabling the microprocessor to arrange the fifth reference signal into the first subcarrier and the second subcarrier; and a code H for enabling the transceiving interface to transmit the fifth reference signal via the first subcarrier and the second subcarrier so that the host apparatus may estimate conditions of a second communication channel between the host apparatus and the another signal transmission apparatus according to the third reference signal and the fourth reference signal and further estimate conditions of the first communication channel between the host apparatus and the signal transmission apparatus according to the fifth reference signal.

* * * * *